United States Patent [19]
Delaby et al.

[11] Patent Number: 5,624,694
[45] Date of Patent: Apr. 29, 1997

[54] MOLD FOR MAKING AN INTERNALLY THREADED HOUSING

[75] Inventors: Aaron D. Delaby, Carlsbad; Paul M. Havlovitz, Escondido, both of Calif.

[73] Assignee: Republic Tool & Mfg. Corp., Carlsbad, Calif.

[21] Appl. No.: 617,089

[22] Filed: Mar. 18, 1996

[51] Int. Cl.⁶ .................................................. B29C 45/44
[52] U.S. Cl. .................. 425/577; 264/318; 425/DIG. 58
[58] Field of Search .......................... 425/DIG. 58, 577; 264/318

[56] References Cited

U.S. PATENT DOCUMENTS

| | | | |
|---|---|---|---|
| 3,402,713 | 9/1968 | Senkowski et al. | 264/318 |
| 4,399,092 | 8/1983 | Snow, Sr. et al. | 264/318 |
| 4,467,994 | 8/1984 | Sorensen | 249/144 |
| 4,543,228 | 9/1985 | Bingler | 425/577 |
| 4,703,957 | 11/1987 | Blenkush | 425/577 |
| 4,856,977 | 8/1989 | von Holdt | 425/468 |
| 4,919,608 | 4/1990 | Catalanotti et al. | 425/556 |
| 4,938,679 | 7/1990 | Pietrorazio | 425/437 |
| 5,038,455 | 8/1991 | Guest | 425/577 |
| 5,200,209 | 4/1993 | Nattel et al. | 425/577 |

FOREIGN PATENT DOCUMENTS

| | | | |
|---|---|---|---|
| 1323194 | 7/1973 | United Kingdom | 425/577 |
| 1343422 | 1/1974 | United Kingdom | 425/577 |

Primary Examiner—Robert Davis
Attorney, Agent, or Firm—Harry Williams

[57] ABSTRACT

First and second mold members are fitted one within another and together define a first annular space for forming a discontinuous single thread in a thin-walled housing, as well as a second annular space coaxial and contiguous with the first annular space; the second space defines the thread on the interior wall of the housing in the form of teeth members for receiving a threaded member associated with a linear adjustment device used with an agricultural implement, such as a spreader.

3 Claims, 1 Drawing Sheet

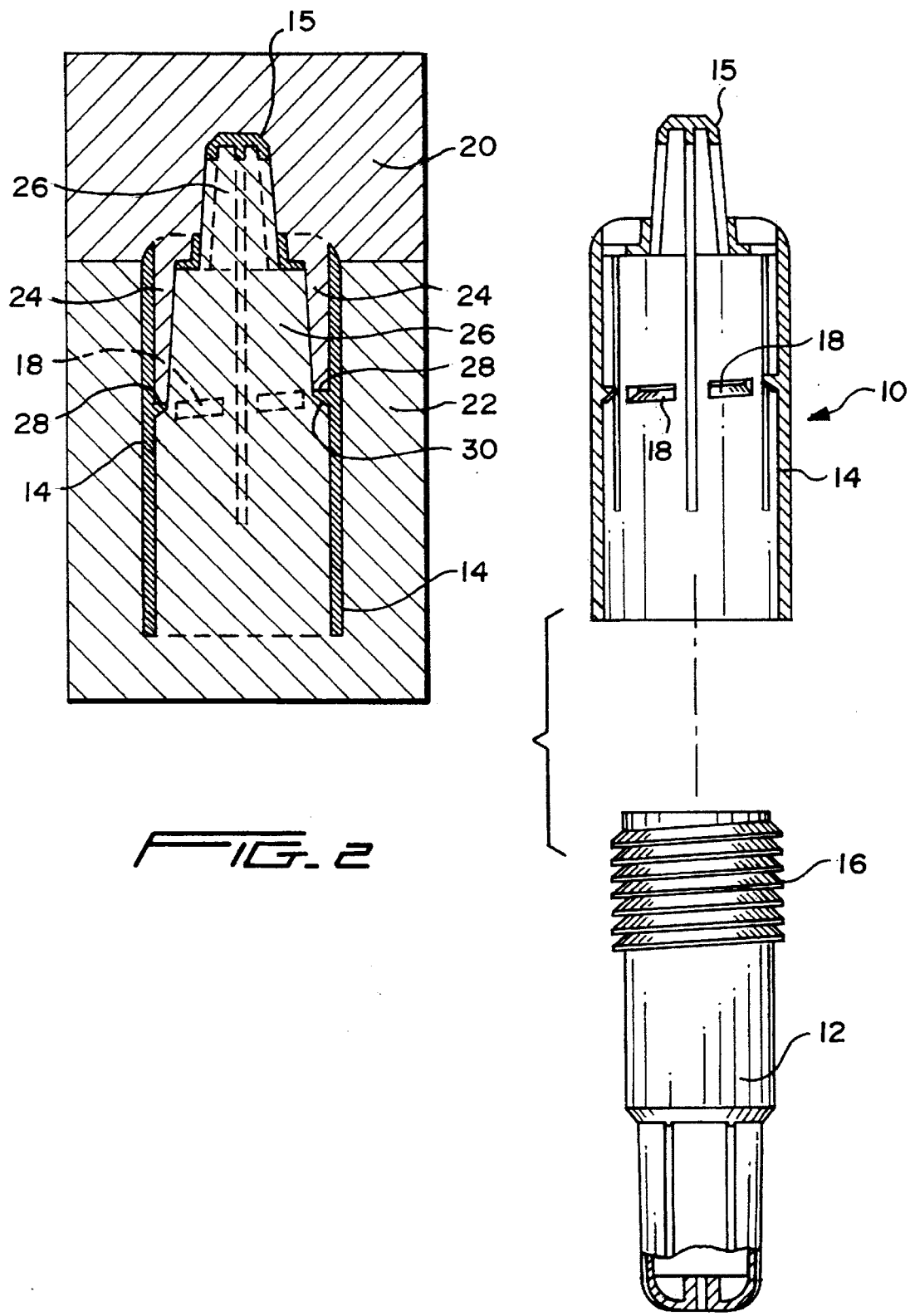

MOLD FOR MAKING AN INTERNALLY THREADED HOUSING

BACKGROUND OF THE INVENTION

The present invention relates to molds for making internal threads or other mechanically engaging detail for a threaded length-adjusting device, such as a micrometer device used with agricultural implements, like the manually propelled wheeled spreader disclosed in our copending application, entitled Collapsible Drop Spreader, Ser. No. 08/504,473, filed Jul. 20, 1995, and assigned to the same assignee as the present invention.

Heretofore the making of such devices having an internal thread or threads by injection molding techniques has required a mold form requiring multiple parts for disassembly after the molding operation, or in other cases requiring the mold core to be rotated or collapsed, an expensive maintenance-prone and time-consuming operation.

OBJECTS AND SUMMARY OF THE INVENTION

It is the principle object and primary purpose of the present invention to address the aforementioned needs and thus provide a new and efficient mold for forming the internally threaded member of a linear or length-adjusting device, such as a micrometer device used with a spreader.

It is a further object of the present invention to provide a simple two-part mold for forming both a thread member on the inside surface of a hollow housing and the hollow housing itself.

According to one embodiment of the invention first and second mold members are fitted one within another to define a first annular space for forming a thin-walled housing for the micrometer device, as well as a second annular space coaxial and contiguous with the first annular space, the second annular space defining segments or portions of a single helical thread for the interior of the thin-walled housing.

The invention will be better understood as well as further features, objects and advantages thereof become more apparent from the ensuing detailed description taken in conjunction with the drawings.

BRIEF DESCRIPTION OF THE DRAWINGS

FIG. 1 is a schematic view partly in cross-section showing the two-part linear adjustment micrometer device used with the spreader, according to the invention; and FIG. 2 is schematic cross-sectional view of the mold for making the housing part of the micrometer device shown in FIG. 1.

DETAILED DESCRIPTION OF THE PREFERRED EMBODIMENT

FIG. 1 shows a linear adjustment device, for example, a micrometer device 10 with its threaded extension member 12 that is connected by conventional means to one end of a flexible cable, as described in our aforementioned patent application, which is incorporated herein by reference. Extension member 12 is screw-threaded into the micrometer housing 14 of the micrometer device 10 in a known manner and the housing 14 by means of a bracket member 15 is connected to an operating lever on the handle of the spreader (not shown). The degree of rotation of the extension member 12 with respect to the housing 14 will vary the length of the micrometer device as a whole and hence the flexible cable and the size of the opening the shutoff bar or slide makes with the opening in the bottom of the hopper. Towards this end, the exterior threads 16 of the extension member are intended to cooperate with an annular array of radially extending teeth 18 disposed on the interior of the housing 14 for the necessary threaded engagement between the two members. The teeth 18 are seen to be discrete elements, each spaced from the other and together forming a single annular row on the internal surface of the housing 14. While this arrangement is preferable, the teeth need not be discrete but could be defined by a single and continuous rim or thread instead. However, the discrete teeth members shown facilitate a working fit without binding between the teeth and the threaded portion 16 of the member 12.

In accordance with the invention, the teeth 18 are fabricated by the mold shown in FIG. 2, which is seen to comprise two parts 20, 22 that fit together, as shown, to form an annular cylindrical space for the plastic material to be injected therein to thereby form the micrometer housing 14. The lower section of the housing 14 is seen to be formed by an annular space in the lower part 22 of the mold. The top part 20 of the mold is seen to have annular extension members 24 that become more narrow in their diametrical or transaxial dimension as they extend downwardly, thus defining a core which caps or telescopes over an upstanding solid core section 26 of the lower part 22 which gradually narrows in its transaxial direction as it extends upwardly along its axis. Together the two cores define a cylindrical core of uniform diameter. Thus, the inner wall of the mold 22 and the outer walls of the extension members 24 of the mold 20 complete the annular space for forming the thin-walled housing 14. It should be understood that the mold section 22 may comprise separate parts (not shown) to allow for the separation of the lower part of the housing 14 from that part of the mold. Preferably, however, the lower part 22 is a unitary piece, as shown.

According to the invention, the faces 28 of the extension members 24 of the upper mold 20 terminate just above sloped or beveled ledge portions 30 at the lower end of the upstanding core section 26 of the lower mold 22 and thus define an auxiliary or second space contiguous with the above-mentioned annular space that forms the housing. This second space defines the triangular shaped teeth 18, as shown in FIG. 1. Each of the teeth 18, then, are formed by the aligned juxtaposition by each of the top mold extension members 24 with each of the underlying ledges 30 of the core 26, thus forming the spaces for the plastic material to be injected therein in a well know manner. The triangular cross-section of the teeth provides a thin edge on the teeth that facilitates entry of the teeth into the threads 16 without binding. However, it is within the scope of the invention to provide other cross-sectional shapes, such as an acme thread, a square thread, or a buttress thread, all well known in the art. If it is desired to form a single continuous thread, that is, one full thread, rather than the discontinuous thread shown, then a continuous annular core is used rather than the discontinuous core composed of separate extension members 24, and this core member then terminates in the same manner just above a continuous ledge portion which, of course, replaces the ledge portions 30.

Thus, according to the invention, an inexpensive two-part mold is provided that obviates the need for an elaborate mold form defining an extended thread structure for matching the external threads 16 of the extension member 12.

The foregoing relates to preferred embodiments of the invention, it being understood that other embodiments and variants thereof are possible within the scope of the invention, the latter being defined by the appended claims.

What is claimed and desired to be secured by Letters Patent of the United States is:

1. A mold for forming a relatively thin-walled hollow housing from injected plastic material, said housing having a single internal thread means on the inner wall thereof, said mold comprising a first mold member having a solid core means defining a first annular space with respect to a wall surface in said first mold member for forming said thin-walled housing, said solid core means having an annular ledge means thereon, and a second mold member having a cavity means surrounding said solid core means of said first mold member and having an outer wall spaced from said wall surface in said first mold member to thereby extend said first annular space in said first mold member, and said cavity means terminating at a location near said annular ledge means on said solid core means of said first mold member and defining with respect thereto a second annular space coaxial and contiguous with said first annular space for forming said single internal thread means.

2. A mold according to claim 1, wherein said hollow core means and said annular ledge means are correspondingly discontinuous in a circumferential direction, whereby said single thread means so formed is discontinuous.

3. A mold for forming a relatively thin-walled hollow housing from injected plastic material, said housing having a single internal thread means on the inner wall thereof for receiving a threaded member of said device, said mold comprising a first mold member having a solid core means having an upper portion diminishing in diameter along the axis thereof and a lower portion of uniform diameter forming an annular space with respect to an outer wall surface in said first mold member for forming said thin-walled housing, said solid core means having an annular ledge means thereon dividing said upper portion from said lower portion, a second mold member having an extension means defining a cavity means diminishing in diameter along an axis thereof and surrounding said upper portion of said solid core means of said first mold member, said upper portion of said solid core means and said extension means together defining a cylinder of uniform diameter continuous with said lower portion of said first mold means for forming said annular space with said outer wall surface therein, and said cavity means terminating at a location near said annular ledge means on said solid core means and defining with respect thereto a second annular space coaxial and contiguous with said first annular space for forming said single internal thread means.

\* \* \* \* \*